US012208883B2

(12) United States Patent
Rey et al.

(10) Patent No.: US 12,208,883 B2
(45) Date of Patent: Jan. 28, 2025

(54) REDUNDANCY SYSTEMS FOR FLY-BY-WIRE VEHICLES

(71) Applicant: Skyryse, Inc., El Segundo, CA (US)

(72) Inventors: Gonzalo Javier Rey, Torrance, CA (US); David James Manzanares, Snohomish, WA (US); Sylvain Alarie, Baden-Wurtenburg (DE); Deon Esterhuizen, Clearwater, FL (US)

(73) Assignee: Skyryse, Inc., El Segundo, CA (US)

( * ) Notice: Subject to any disclaimer, the term of this patent is extended or adjusted under 35 U.S.C. 154(b) by 0 days.

(21) Appl. No.: 18/597,818

(22) Filed: Mar. 6, 2024

(65) Prior Publication Data
US 2024/0326986 A1   Oct. 3, 2024

Related U.S. Application Data

(63) Continuation of application No. 17/382,822, filed on Jul. 22, 2021, now Pat. No. 11,952,108.

(60) Provisional application No. 63/058,372, filed on Jul. 29, 2020.

(51) Int. Cl.
*B64C 13/00* (2006.01)
*B64C 13/50* (2006.01)

(52) U.S. Cl.
CPC .......... *B64C 13/505* (2018.01); *B64C 13/503* (2013.01)

(58) Field of Classification Search
CPC ..................... B64C 13/505; B64C 13/503
See application file for complete search history.

(56) References Cited

U.S. PATENT DOCUMENTS

| | | |
|---|---|---|
| 3,783,250 A | 1/1974 | Fletcher et al. |
| 4,115,847 A | 9/1978 | Osder et al. |
| 4,472,780 A | 9/1984 | Chenoweth et al. |
| 4,965,879 A | 10/1990 | Fischer |
| 5,493,497 A | 2/1996 | Buus |
| 5,515,282 A | 5/1996 | Jackson |
| 5,802,077 A | 9/1998 | Yeh |
| 5,806,805 A | 9/1998 | Elbert et al. |

(Continued)

OTHER PUBLICATIONS

PCT International Search Report and Written Opinion, PCT Application No. PCT/US21/42761, Nov. 3, 2021, 19 pages.

(Continued)

*Primary Examiner* — Ian Jen
(74) *Attorney, Agent, or Firm* — Fenwick & West LLP

(57) ABSTRACT

A universal vehicle control router for fly-by-wire aircraft may include multiple vehicle control computers, such as flight control computers. Each flight control computer may be part of an independent channel that provides instructions to multiple actuators to control multiple vehicle components. Each channel is a distinct pathway capable of delivering a system function, such as moving an actuator. Each flight control computer may include a fully analyzable and testable voter (FAT voter). In the event of a failure to one of the flight control computers, the FAT voters may cause the failing flight control computer to be ignored or shut off power. Each flight control computer may comprise a backup battery. In the event of a power disruption from the primary power source, such as a generator and primary battery, the backup battery may power the flight control computer and all actuators.

20 Claims, 6 Drawing Sheets

(56) References Cited

U.S. PATENT DOCUMENTS

| | | | |
|---|---|---|---|
| 6,295,492 B1 * | 9/2001 | Lang | G07C 5/008 |
| | | | 701/32.4 |
| 7,020,790 B2 | 3/2006 | Mares | |
| 7,337,044 B2 | 2/2008 | Platzer et al. | |
| 7,421,320 B2 | 9/2008 | Yeh | |
| 10,029,782 B2 | 7/2018 | Kossentini et al. | |
| 10,571,914 B2 | 2/2020 | Matsui | |
| 11,242,919 B2 | 2/2022 | Honjo et al. | |
| 11,411,474 B1 | 8/2022 | White et al. | |
| 2005/0273653 A1 | 12/2005 | Zubkow | |
| 2007/0033511 A1 | 2/2007 | Davies | |
| 2007/0083301 A1 | 4/2007 | Yeh | |
| 2012/0290153 A1 | 11/2012 | Olsoe et al. | |
| 2016/0122003 A1 | 5/2016 | Bara et al. | |
| 2016/0244156 A1 | 8/2016 | Leng | |
| 2017/0081019 A1 | 3/2017 | Lin et al. | |
| 2019/0004515 A1 | 1/2019 | Matsui | |
| 2020/0031454 A1 | 1/2020 | Wilkens | |

OTHER PUBLICATIONS

United States Office Action, U.S. Appl. No. 17/382,822, filed Mar. 9, 2023, 22 pages.
United States Office Action, U.S. Appl. No. 17/382,822, filed Sep. 13, 2023, 15 pages.
European Patent Office, Extended European Search Report and Opinion, EP Patent Application No. EP 21851431, Apr. 26, 2024, eight pages.

* cited by examiner

500

```
┌─────────────────────────────────────────────────────────────────────────┐
│ Receive a flight control input for a small aircraft having a single     │
│ power bus.                                                              │
│                                  510                                    │
└─────────────────────────────────────────────────────────────────────────┘
                                    │
                                    ▼
┌─────────────────────────────────────────────────────────────────────────┐
│ Generate an actuator instruction for an actuator based on the flight    │
│ control input.                                                          │
│                                  520                                    │
└─────────────────────────────────────────────────────────────────────────┘
                                    │
                                    ▼
┌─────────────────────────────────────────────────────────────────────────┐
│ Perform a self-assessment of a first flight control computer.           │
│                                  530                                    │
└─────────────────────────────────────────────────────────────────────────┘
                                    │
                                    ▼
┌─────────────────────────────────────────────────────────────────────────┐
│ Perform an assessment of the first flight control compute by a second   │
│ flight control computer.                                                │
│                                  540                                    │
└─────────────────────────────────────────────────────────────────────────┘
                                    │
                                    ▼
┌─────────────────────────────────────────────────────────────────────────┐
│ Determine, based in part on the self-assessment and the assessment of   │
│ the first flight control computer by the second flight control         │
│ computer, a validity of the actuator instruction generated by the first│
│ flight control computer.                                                │
│                                  550                                    │
└─────────────────────────────────────────────────────────────────────────┘
                                    │
                                    ▼
┌─────────────────────────────────────────────────────────────────────────┐
│ Transmit, in response to the actuator instruction being valid, the      │
│ actuator instruction to the actuator.                                   │
│                                  560                                    │
└─────────────────────────────────────────────────────────────────────────┘
```

*FIG. 5*

REDUNDANCY SYSTEMS FOR FLY-BY-WIRE VEHICLES

CROSS REFERENCE TO RELATED APPLICATIONS

This application is a continuation of U.S. application Ser. No. 17/382,822, filed Jul. 22, 2021, which claims the benefit of U.S. Provisional Application No. 63/058,372, filed Jul. 29, 2020, each of which is incorporated by reference herein in its entirety.

TECHNICAL FIELD

The disclosure generally relates to the field of vehicle control systems, and particularly to redundancy systems for vehicles.

BACKGROUND

Vehicle control and interface systems, such as control systems for aerial vehicles (e.g., rotorcraft or fixed wing aircraft), often require specialized knowledge and training for operation by a human operator. The specialized knowledge and training is necessitated, for instance, by the complexity of the control systems and safety requirements of the corresponding vehicles. Moreover, vehicle control and interface systems are specifically designed for types or versions of certain vehicles. For example, specific rotorcraft and fixed wing aircraft control systems are individually designed for their respective contexts. As such, even those trained to operate one vehicle control system may be unable to operate another control system for the same or similar type of vehicle without additional training. Although some conventional vehicles control systems provide processes for partially or fully automated vehicle control, such systems are still designed for individual vehicle contexts.

Fly-by-wire systems, in which vehicles are controlled through electronic interfaces, are typically limited to large commercial and private jet aircraft. Many smaller general aviation (GA) aircraft are capable of safe flight even when electrical power is lost. However, for fly-by-wire systems, the systems may not operate properly without electrical power. In contrast to larger commercial aircraft, the availability of the power supply in GA aircraft often cannot support the safety levels required for a full fly-by-wire system without mechanical manual reversion. Some GA aircraft have a single power bus. If power is interrupted to the power bus, the electronic components of the aircraft may not function. Thus, for GA aircraft, new power architectures are needed to reliably provide electrical power to implement fly-by-wire systems.

Internal or external events may damage a flight control computer in a fly-by-wire system. For example, a defect in the processor or other component either due to a design flaw or a production quality flaw may lead to malfunction, or radiation may alter the state of a memory chip, which may cause unpredictable effects to the flight control computer. Small GA aircraft may not have the available space or power to implement the redundancy systems utilized by large commercial aircraft. Thus, to ensure the integrity of instructions generated by the fly-by-wire systems on GA aircraft, new redundancy systems are needed to account for processor insanity or power loss in a way that is self-contained, as well as more weight, space, and cost efficient.

SUMMARY

A universal vehicle control router for small fly-by-wire vehicles may include multiple vehicle control computers, such as flight control computers. Each flight control computer may be part of an independent channel that provides instructions to multiple actuators to control multiple vehicle components. Each channel is a distinct pathway capable of delivering a system function, such as moving an actuator. Each flight control computer may include a fully analyzable and testable voter (FAT voter). In the event of a failure to one of the flight control computers, the FAT voters may cause the failing flight control computer to be ignored or shut off power. Each flight control computer may comprise a backup battery. In the event of a power disruption from the primary power source, such as a generator and primary battery, the backup battery may power the flight control computer and all actuators.

In some embodiments, in contrast to redundancy systems in large aircraft, the universal vehicle control router, including all flight control computers and backup batteries, may be mounted to a single rack and located in a small location, such as between two pilot seats. For large commercial aircraft, each flight control computer may be located in a separate zone in the aircraft, so that in the event of a fire or other major issue in one zone, the other flight control computers may be safe. For small GA aircraft, the aircraft may have only two zones: an engine compartment and all other areas.

In some embodiments, a non-transitory computer readable storage medium may be configured to store instructions that, when executed by a processor of a control and interface system, cause the processor to perform operations comprising receiving a flight control input for a small aircraft having a single power bus. The operations may comprise generating an actuator instruction based on the flight control input. The operations may comprise performing a self-assessment of a first flight control computer. The operations may comprise performing an assessment of the first flight control computer by a second flight control computer. The operations may comprise determining, based in part on the self-assessment and the assessment of the first flight control computer by the second flight control computer, a validity of the actuator instruction generated by the first flight control computer. The operations may comprise transmitting, in response to the actuator instruction being valid, the actuator instruction to the actuator.

In some embodiments, a method may comprise receiving a flight control input for a small aircraft having a single power bus. The method may comprise generating an actuator instruction for an actuator based on the flight control input. The method may comprise performing a self-assessment of a first flight control computer. The method may comprise performing an assessment of the first flight control computer by a second flight control computer. The method may comprise determining, based in part on the self-assessment and the assessment of the first flight control computer by the second flight control computer, a validity of the actuator instruction generated by the first flight control computer. The method may comprise transmitting, in response to the actuator instruction being valid, the actuator instruction to the actuator.

In some embodiments, a fly-by-wire system for a small aircraft may comprise a universal vehicle control interface configured to receive input commands from a pilot and a universal avionics control router. The universal avionics control router may comprise a plurality of flight control computers, each flight control computer being part of a channel including a motor and electronics for each actuator corresponding to each of a plurality of aircraft components. The universal avionics control router may be configured to receive, via the universal vehicle control interface, a flight control input. The universal avionics control router may be configured to generate, by each flight control computer of the universal avionics control router, actuator instructions for a plurality of actuators in respective channels of the flight control computers based on the flight control input. The universal avionics control router may be configured to perform, by each flight control computer, a self-assessment. The universal avionics control router may be configured to perform, by each flight control computer, an assessment of all other flight control computers of the universal avionics control router. The universal avionics control router may be configured to determine, using a fully analyzable and testable voter in each channel, based in part on the self-assessment and the assessment of each flight control computer by the other flight control computers, a validity of the actuator instructions generated by each first flight control computer. The universal avionics control router may be configured to transmit, in response to the actuator instructions being valid, the actuator instructions to the plurality of actuators.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one example embodiment of a vehicle control and interface system.

FIG. 5 is a flow diagram illustrating one example embodiment of a process for providing actuator instructions in a redundant architecture.

DETAILED DESCRIPTION

Figure 1:
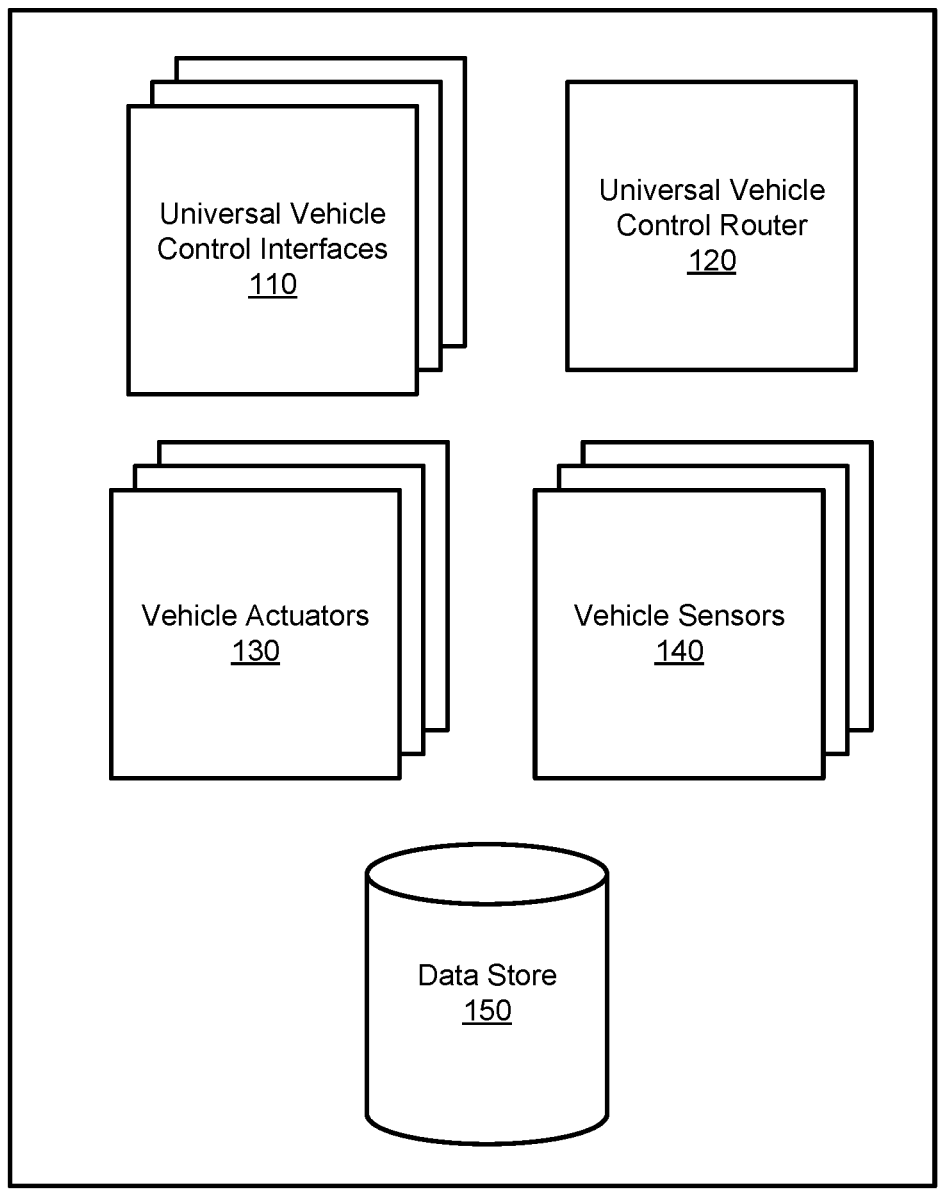

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of a disclosed system, method and a non-transitory computer readable storage medium include redundancy systems for small fly-by-wire vehicles. The redundancy systems may be implemented in aircraft that cannot otherwise guarantee the integrity and availability of power to the level required for a full fly-by-wire system without mechanical or manual reversion. The redundancy systems may be implemented in conjunction with a vehicle control and interface system for controlling different vehicles through universal vehicle control inputs. Universal vehicle control inputs allow a vehicle operator to operate different types of vehicles using the same set of inputs. In addition to small fly-by-wire aircraft, the vehicle control and interface system may be integrated with different types of vehicles (e.g., rotorcraft, fixed wing aircraft, motor vehicles, watercraft, etc.) in order to facilitate operation of the different vehicles using universal vehicle control inputs. In particular, the vehicle control and interface system receives inputs requesting operation of a vehicle originating from one or more universal vehicle control interfaces and converts (or translates) them into commands for specific actuators of the vehicle configured to achieve the requested operation. By way of example, to convert the inputs to actuator commands, the vehicle control and interface system processes the inputs using a universal vehicle control router. The universal vehicle control router is configured to receive universal vehicle control inputs and convert the universal vehicle control inputs into actuator commands for a specific vehicle.

In example embodiments, the universal vehicle control router may include multiple vehicle control computers, such as flight control computers. Each flight control computer may be part of an independent channel that provides instructions to multiple actuators to control multiple vehicle components. Each channel is a distinct pathway capable of delivering a system function, such as moving an actuator. Each flight control computer may include a fully analyzable and testable voter (FAT voter). A voter is fully analyzable and testable if the input and output values may be measured at each location in a circuit of the voter, if every possible test value may be input to the voter to measure output values, and if every possible output value can be achieved by modifying the inputs. In the event of a failure to one of the flight control computers, the FAT voters may cause the failing flight control computer to be ignored or shut off power. The FAT voter may passivate a control channel that is voted to be invalid by the other channels.

Each control channel may comprise an isolated backup battery. In the event of a power disruption from the primary power source, such as a generator, primary battery, wire harness, and connectors, the backup battery may power the flight control computer and all actuators.

The disclosed systems may increase vehicle safety by providing a full fly-by-wire (FBW) architecture with triple redundancy. The systems may enable retrofitting an existing vehicle with an autonomous agent (and/or enable autonomous agent certification) by providing a sufficient degree of control and power redundancy to autonomous agents. Additionally, such systems may provide distributed redundant control modules about the vehicle, thereby providing increased resilience of power systems (and autonomous agents alike) to EMI interference, electrical failure, lightning, bird-strike, mechanical impact, internal/external fluid spills, and other localized issues.

The disclosed systems may enable autonomous and/or augmented control schemes without relying on the pilot (or other operator) as a backup in the event of power failure. Accordingly, such systems may fully eliminate the 'direct human control' layer because augmented modes are persistent in the event of multiple failures, including power failures, (e.g., augmented control modes can rely on triply-redundant, continuous backup power). In a specific example, an aircraft is configured to autonomously land (and/or augment landing) even with generator failure and/or no primary electrical power supply to the aircraft. In a second specific example, each of three flight control computers is capable of providing fully augmented and/or autonomous control (or landing). Such systems may allow transportation providers and users to decrease training for 'direct' or 'manual' modes (where they are the backup; and relied upon to provide mechanical actuation inputs). Such systems may further reduce the cognitive load on pilots in safety-critical and/or stressful situations, since they can rely on persistent augmentation during all periods of operation.

The disclosed systems may reduce vehicle mass and/or cost (e.g., especially when compared to equivalently redundant systems). By co-locating multiple flight critical components and functions within a single housing, systems can reduce the cable length, minimize the number of distinct connections required for vehicle integration (thereby improving ease of assembly), and allow use of less expensive sensors and/or processors without an electronics bay (e.g., as individual components can often require unique electrical and/or environmental protections). Similarly, integration of the system in a vehicle can allow the vehicle to operate without (e.g., can allow physical removal of) various vehicle components necessary for manual flight, such as: hydraulic pumps, fluid lines, pilot-operated mechanical linkages, and/or any other suitable components. In some embodiments, modules can additionally enable after-market FBW integration on an existing vehicles while utilizing the existing electrical infrastructure, which can substantially decrease the overall cost of FBW solutions.

Example System Environment

FIG. 1 illustrates one example embodiment of a vehicle control and interface system 100. In the example embodiment shown, vehicle control and interface system 100 includes one or more universal vehicle control interfaces 110, universal vehicle control router 120, one or more vehicle actuators 130, one or more vehicle sensors 140, and one or more data stores 150. In other embodiments, the vehicle control and interface system 100 may include different or additional elements. Furthermore, the functionality may be distributed among the elements in a different manner than described. The elements of FIG. 1 may include one or more computers that communicate via a network or other suitable communication method.

The vehicle control and interface system 100 may be integrated with various vehicles having different mechanical, hardware, or software components. For example, the vehicle control and interface system 100 may be integrated with fixed wing aircraft (e.g., airplanes), rotorcraft (e.g., helicopters), spacecraft, motor vehicles (e.g., automobiles), watercraft (e.g., power boats or submarines), or any other suitable vehicle. As described in greater detail below with reference to FIGS. 2-6, the vehicle control and interface system 100 is advantageously configured to receive inputs for requested operation of a particular vehicle via universal set of interfaces and the inputs to appropriate instructions for mechanical, hardware, or software components of the particular vehicle to achieve the requested operation. In doing so, the vehicle control and interface system 100 enables human operators to operate different vehicles using the same universal set of interfaces or inputs. By way of example, "universal" indicates that a feature of the vehicle control and interface system 100 may operate in a vehicle-agnostic manner. This allows for vehicle integration without necessarily having to design and configure vehicle specific customizations or reconfigurations in order to integrate the specific feature. Although universal features of the vehicle control and interface system 100 can function in a vehicle-agnostic manner, the universal features may still be configured for particular contexts. For example, the vehicle control or interface system 100 may receive or process inputs describing three-dimensional movements for vehicles that can move in three dimensions (e.g., aircraft) and conversely may receive or process inputs describing two-dimensional movements for vehicles that can move in two dimensions (e.g., automobiles). One skilled in the art will appreciate that other context-dependent configurations of universal features of the vehicle control and interface system 100 are possible.

The universal vehicle control interfaces 110 are a set of universal interfaces configured to receive a set of universal vehicle control inputs to the vehicle control and interface system 100. The universal vehicle control interfaces 110 may include one or more digital user interfaces presented to an operator of a vehicle via one or more electronic displays. Additionally, or alternatively, the universal vehicle control interfaces 110 may include one or more hardware input devices, e.g., one or more control sticks inceptors, such as side sticks, center sticks, throttles, cyclic controllers, or collective controllers. The universal vehicle control interfaces 110 receive universal vehicle control inputs requesting operation of a vehicle. In particular, the inputs received by the universal vehicle control interfaces 110 may describe a requested trajectory of the vehicle, such as to change a velocity of the vehicle in one or more dimensions or to change an orientation of the vehicle. Because the universal vehicle control inputs describe an intended trajectory of a vehicle directly rather than describing vehicle-specific precursor values for achieving the intended trajectory, such as vehicle attitude inputs (e.g., power, lift, pitch, roll yaw), the universal vehicle control inputs can be used to universally describe a trajectory of any vehicle. This is in contrast to existing systems where control inputs are received as vehicle-specific trajectory precursor values that are specific to the particular vehicle. Advantageously, any individual interface of the set of universal vehicle control interfaces 110 configured to receive universal vehicle control inputs can be used to completely control a trajectory of a vehicle. This is in contrast to conventional systems, where vehicle trajectory must be controlled using two or more interfaces or inceptors that correspond to different axes of movement or vehicle actuators. For instance, conventional rotorcraft systems include different cyclic (controlling pitch and roll), collective (controlling heave), and pedal (controlling yaw) inceptors. Similarly, conventional fixed-wing aircraft systems include different stick or yoke (controlling pitch and role), power (controlling forward movement), and pedal (controlling yaw) inceptors.

In various embodiments, inputs received by the universal vehicle control interfaces 110 can include "steady-hold" inputs, which may be configured to hold a parameter value fixed (e.g., remain in a departed position) without a continuous operator input. Such variants can enable hands-free operation, where discontinuous or discrete inputs can result in a fixed, continuous input. In a specific example, a user of the universal vehicle control interfaces 110 can provide an input (e.g., a speed input) and subsequently remove their hands with the input remaining fixed. Alternatively, or additionally, inputs received by the universal vehicle control interfaces 110 can include one or more self-centering or automatic return inputs, which return to a default state without a continuous user input.

In some embodiments, the universal vehicle control interfaces 110 include interfaces that provide feedback information to an operator of the vehicle. For instance, the universal vehicle control interfaces 110 may provide information describing a state of a vehicle integrated with the universal vehicle control interfaces 110 (e.g., current vehicle speed, direction, orientation, location, etc.). Additionally, or alternatively, the universal vehicle control interfaces 110 may provide information to facilitate navigation or other operations of a vehicle, such as visualizations of maps, terrain, or other environmental features around the vehicle.

The universal vehicle control router 120 routes universal vehicle control inputs describing operation of a vehicle to components of the vehicle suitable for executing the operation. In particular, the universal vehicle control router 120 receives universal vehicle control inputs describing the operation of the vehicle, processes the inputs using information describing characteristics of the vehicle, and outputs a corresponding set of commands for actuators of the vehicle (e.g., the vehicle actuators 130) suitable to achieve the operation. The universal vehicle control router 120 may use various information describing characteristics of a vehicle in order to convert universal vehicle control inputs to a suitable set of commands for actuators of the vehicle. Additionally, or alternatively, the universal vehicle control router 120 may convert universal vehicle control inputs to a set of actuator commands using a set of control laws that enforce constraints (e.g., limits) on operations requested by the universal control inputs. For example, the set of control laws may include velocity limits (e.g., to prevent stalling in fixed-wing aircraft), acceleration limits, turning rate limits, engine power limits, rotor revolution per minute (RPM) limits, load power limits, allowable descent altitude limits, etc. After determining a set of actuator commands, the universal vehicle control router 120 may transmit the commands to relevant components of the vehicle for causing corresponding actuators to execute the commands. Embodiments of the universal vehicle control router 120 are described in greater detail below with reference to FIG. 2.

The universal vehicle control router 120 can decouple axes of movement for a vehicle in order to process received universal vehicle control inputs. In particular, the universal vehicle control router 120 can process a received universal vehicle control input for one axis of movement without impacting other axes of movement such that the other axes of movement remain constant. In this way, the universal vehicle control router 120 can facilitate "steady-hold" vehicle control inputs, as described above with reference to the universal vehicle control interfaces 110. This is in contrast to conventional systems, where a vehicle operator must manually coordinate all axes of movement independently for a vehicle in order to produce movement in one axis (e.g., a pure turn, a pure altitude climb, a pure forward acceleration, etc.) without affecting the other axes of movement.

In some embodiments, the universal vehicle control router 120 is configured to use one or more models corresponding to a particular vehicle to convert universal vehicle control inputs to a suitable set of commands for actuators of the vehicle. For example, a model may include a set of parameters (e.g., numerical values) that can be used as input to universal input conversion processes in order to generate actuator commands suitable for a particular vehicle. In this way, the universal vehicle control router 120 can be integrated with vehicles by substituting models used by processes of the universal vehicle control router 120, enabling efficient integration of the vehicle control and interface system 100 with different vehicles. The one or more models may be obtained by the universal vehicle control router 120 from a vehicle model database or other first-party or third-party system, e.g., via a network. In some cases, the one or more models may be static after integration with the vehicle control and interface system 100, such as if a vehicle integrated with the vehicle control and interface system 100 receives is certified for operation by a certifying authority (e.g., the United States Federal Aviation Administration). In some embodiments, parameters of the one or more models are determined by measuring data during real or simulated operation of a corresponding vehicle and fitting the measured data to the one or more models.

In some embodiments, the universal vehicle control router 120 processes universal vehicle control inputs according to a current phase of operation of the vehicle. For instance, if the vehicle is a rotorcraft, the universal vehicle control router 120 may convert a universal input describing an increase in lateral speed to one or more actuator commands differently if the rotorcraft is in a hover phase or in a forward flight phase. In particular, in processing the lateral speed increase universal input the universal vehicle control router 120 may generate actuator commands causing the rotorcraft to strafe if the rotorcraft is hovering and causing the rotorcraft to turn if the rotorcraft is in forward flight. As another example, in processing a turn speed increase universal input the universal vehicle control router 120 may generate actuator commands causing the rotorcraft to perform a pedal turn if the rotorcraft is hovering and ignore the turn speed increase universal input if the rotorcraft is in another phase of operation. As a similar example for a fixed-wing aircraft, in processing a turn speed increase universal input the universal vehicle control router 120 may generate actuator commands causing the fixed-wing aircraft to perform tight ground turn if the fixed-wing aircraft is grounded and ignore the turn speed increase universal input if the fixed-wing aircraft is in another phase of operation. One skilled in the art will appreciate that the universal vehicle control router 120 may perform other suitable processing of universal vehicle control inputs to generate actuator commands in consideration of vehicle operation phases for various vehicles.

The universal vehicle control router 120 may comprise multiple flight control computers configured to provide instructions to vehicle actuators 130 in a redundant configuration. Each flight control computer may be independent, such that no single failure affects multiple flight control computer simultaneously. Each flight control computer may comprise a processor, multiple control modules, and a FAT voter. Each flight control computer may be associated with a backup battery. Each flight control computer may comprise a self-assessment module that inactivates the FCC in the event that the self-assessment module detects a failure. The FAT voters may work together to vote on which FCCs should be enabled.

The vehicle actuators 130 are one or more actuators configured to control components of a vehicle integrated with the universal vehicle control interfaces 110. For instance, the vehicle actuators may include actuators for controlling a power-plant of the vehicle (e.g., an engine). Furthermore, the vehicle actuators 130 may vary depending on the particular vehicle. For example, if the vehicle is a rotorcraft the vehicle actuators 130 may include actuators for controlling lateral cyclic, longitudinal cyclic, collective, and pedal controllers of the rotorcraft. As another example, if the vehicle is a fixed-wing aircraft the vehicle actuators 130 may include actuators for controlling a rudder, elevator, ailerons, and power-plant of the fixed-wing aircraft. Each vehicle actuator 130 may comprise multiple motors configured to move the vehicle actuator 130. Each motor for a vehicle actuator 130 may be controlled by a different FCC. Every vehicle actuator 130 may comprise at least one motor controlled by each FCC. Thus, any single FCC may control every vehicle actuator 130 on the vehicle.

The vehicle sensors 140 are sensors configured to capture corresponding sensor data. In various embodiments the vehicle sensors 140 may include, for example, one or more global positioning system (GPS) receivers, inertial measurement units (IMUs), accelerometers, gyroscopes, magnetometers, pressure sensors (altimeters, static tubes, pitot tubes, etc.), temperature sensors, vane sensors, range sensors (e.g., laser altimeters, radar altimeters, lidars, radars, ultrasonic range sensors, etc.), terrain elevation data, geographic data, airport or landing zone data, rotor revolutions per minute (RPM) sensors, manifold pressure sensors, or other suitable sensors. In some cases, the vehicle sensors 140 may include, for example, redundant sensor channels for some or all of the vehicle sensors 140. The vehicle control and interface system 100 may use data captured by the vehicle sensors 140 for various processes. By way of example, the universal vehicle control router 120 may use vehicle sensor data captured by the vehicle sensors 140 to determine an estimated state of the vehicle.

The data store 150 is a database storing various data for the vehicle control and interface system 100. For instance, the data store 150 may store sensor data (e.g., captured by the vehicle sensors 140), vehicle models, vehicle metadata, or any other suitable data.

Example Vehicle Control Router with Redundant Flight Control Computers

Figure 2:
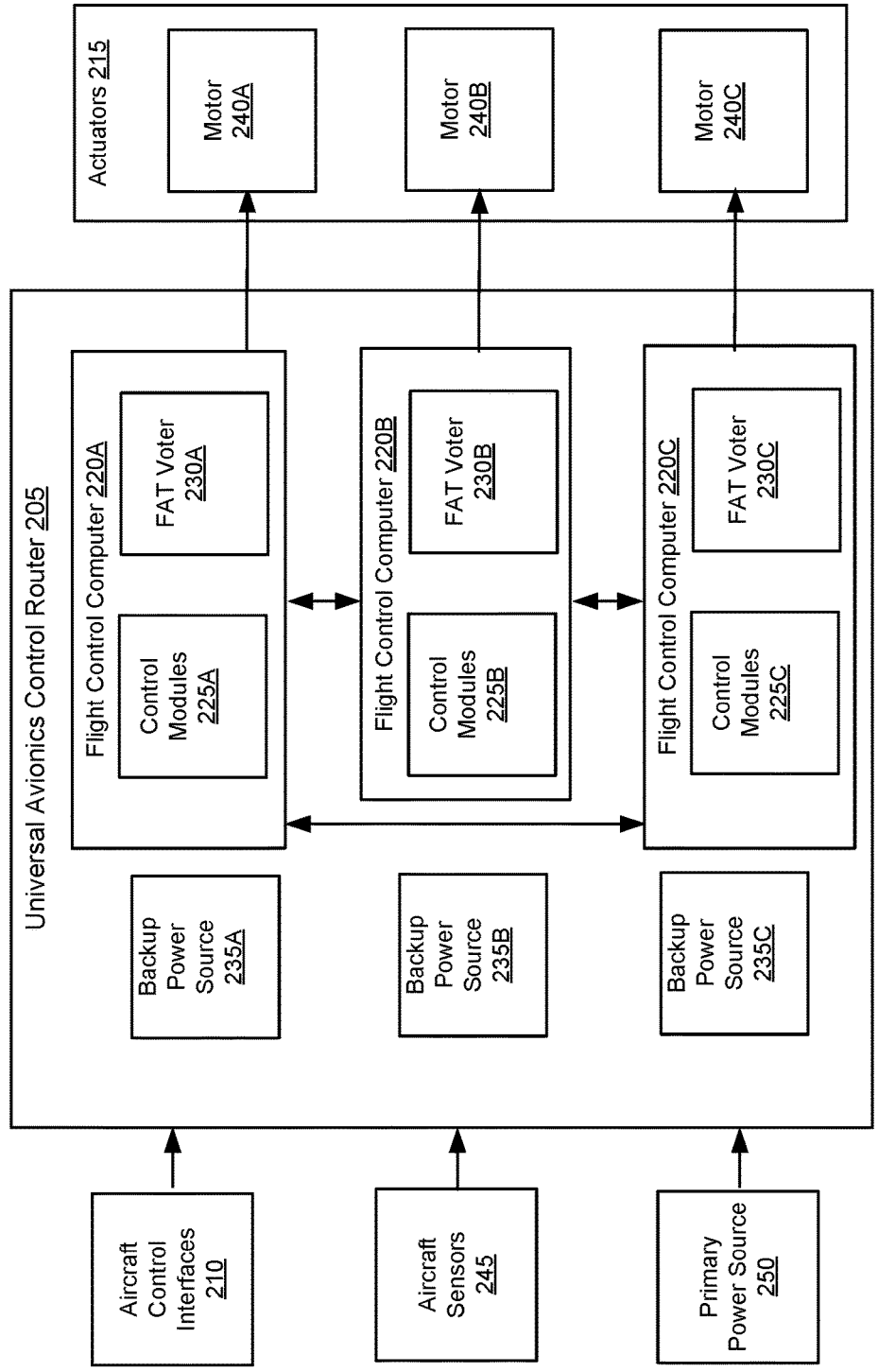
FIG. 2 illustrates one example embodiment of a configuration for a set of redundant flight control computers in a vehicle.

FIG. 2 illustrates one embodiment of a schematic diagram 200 for a universal avionics control router 205 in a redundant configuration, in accordance with an embodiment. The universal avionics control router 205 may be an embodiment of the universal vehicle control router 120. Although the embodiment depicted in FIG. 2 is particularly directed to operating an aircraft (e.g., a rotorcraft or fixed wing aircraft), one skilled in the art will appreciate that similar systems can be used with other vehicles, such as motor vehicles or watercraft.

Aircraft control interfaces 210 are configured to provide universal aircraft control inputs to the universal avionics control router 205. The aircraft control interfaces 210 may be embodiments of the universal vehicle control interfaces 110. In particular, the aircraft control interfaces 210 may include an inceptor device, a gesture interface, and an automated control interface. The aircraft control interfaces 210 may be configured to receive instructions from a human pilot as well as instructions from an autopilot system and convert the instructions into universal aircraft control inputs to the universal avionics control router 205. At a given time, the universal aircraft control inputs may include inputs received from some or all of the aircraft control interfaces 210. Inputs received from the aircraft control interfaces 210 are routed to the universal avionics control router 205. The aircraft control interfaces 210 may generate multiple sets of signals, such as one set of signals for each flight control channel via separate wire harnesses and connectors. Inputs received by the aircraft control interfaces 210 may include information for selecting or configuring automated control processes, such as automated aircraft control macros (e.g., macros for aircraft takeoff, landing, or autopilot) or automated mission control (e.g., navigating an aircraft to a target location in the air or ground).

The universal avionics control router 205 is configured to convert the inputs received from the aircraft control interfaces 210 into instructions to an actuator 215 configured to move an aircraft component. The universal avionics control router 205 comprises a plurality of flight control computers 220A, 220B, 220C (Collectively 220). Each flight control computer 220 comprises a plurality of control modules 225A, 225B, 225C (Collectively 225), a FAT voter 230A, 230B, 230C (Collectively 230), and one or more processors (not shown). Each flight control computer 220 is associated with a backup power source 235A, 235B, 235C (Collectively 235) configured to provide power to the associated flight control computer 220. In the illustrated embodiment, the universal avionics flight control router 205 comprises three flight control computers 220. However, in other embodiments, the universal avionics control router 205 may comprise two, four, five, or any other suitable number of flight control computers 220.

Each flight control computer 220 is configured to receive inputs from the aircraft control interfaces 210 and provide instructions to actuators 215 configured to move aircraft components in a redundant configuration. Each flight control computer 220 operates in an independent channel from the other flight control computer 220. Each independent channel comprises distinct dedicated components, such as wiring, cabling, servo motors, etc., that is separate from the components of the other independent channels. The independent channel includes the plurality of motors 240 to which the flight control computer provides commands. One or more components of each flight control computer 220 may be manufactured by a different manufacturer, be a different model, or some combination thereof, to prevent a design instability from being replicated across flight control computers 220. For example, in the event that a chip in a processor is susceptible to failure in response to a particular sequence of inputs, having different chips in the processors of the other flight control computers 220 may prevent simultaneous failure of all flight control computers in response to encountering that particular sequence of inputs.

Each flight control computer 220 comprises a plurality of control modules 225 configured to convert inputs from the aircraft control interfaces 210 and aircraft sensors 245 into actuator instructions. The control modules may comprise an automated aircraft control module, an aircraft state estimation module, a sensor validation module, a command processing module, and a control laws module. The automated aircraft control module may be configured to generate a set of universal aircraft control inputs suitable for executing automated control processes. The aircraft state estimation module may be configured to determine an estimated aircraft state of the aircraft using validated sensor signals, such as an estimated 3D position of the vehicle with respect to the center of the Earth, estimated 3D velocities of the aircraft with respect to the ground or with respect to a moving air mass, an estimated 3D orientation of the aircraft, estimated 3D angular rates of change of the aircraft, an estimated altitude of the aircraft, or any other suitable information describing a current state of the aircraft. The sensor validation module is configured to validate sensor signals captured by the aircraft sensors 245. For example, the sensors may be embodiments of the vehicle sensors 140 described above with reference to FIG. 1. The command processing module is configured to generate aircraft trajectory values using the universal aircraft control inputs. The aircraft trajectory values describe universal rates of change of the aircraft along movement axes of the aircraft in one or more dimensions.

The control laws module is configured to generate the actuator commands (or signals) using the aircraft position values. The control laws module includes an outer processing loop and an inner processing loop. The outer processing loop applies a set of control laws to the received aircraft position values to convert aircraft position values to corresponding allowable aircraft position values. Conversely, the inner processing loop converts the allowable aircraft position values to the actuator commands configured to operate the aircraft to achieve the allowable aircraft position values. Both the outer processing loop and the inner processing loop are configured to operate independently of the particular aircraft including the universal avionics control router 205. In order to operate independently in this manner, the inner and outer processing loops may use a model including parameters describing characteristics of the aircraft that can be used as input to processes or steps of the outer and inner processing loops. The control laws module may use the actuator commands to directly control corresponding actuators, or may provide the actuator commands to one or more other components of the aircraft to be used to operate the corresponding actuators.

The FAT voters 230 are configured to work together to determine which channels should be prevented from controlling the downstream functions, such as control of an actuator 215. Each FAT voter 230 comprises a channel enable logic configured to determine whether that channel should remain active. In response to a FAT voter 230 determining that its associated flight control computer 220 is malfunctioning during a self-assessment routine, the FAT voter 230 may disconnect the flight control computer 220 from the motors 240 in its channel, thus disconnecting the flight control computer 220 from all actuators 215. The self-assessment is performed in the processor of the flight control computer 220 based on high assurance software. The self-assessment routine assumes that the processor is in good working order. Each flight control computer 220 evaluates the signal output by the other channels to determine whether the other channels should be deactivated. Each flight control computer 220 compares the other flight control computers' 220 control commands to the downstream functions as well as other signals contained in the cross-channel data link to its own. Each flight control computer 220 may be connected to the other flight control computers 220 via a cross-channel data link. The flight control computer 220 executes a failure detection algorithm to determine the sanity of the other flight control computers 220. In response to other flight control computers 220 determining that a flight control computer 220 is malfunctioning, the FAT voter 230 for the malfunctioning flight control computer 220 may disconnect the malfunctioning flight control computer 220 from the motors 240 in its channel. In some embodiments, the FAT voter 230 may disconnect power to the malfunctioning flight control computer 220.

The backup power sources 235 are configured to provide power to the flight control computers 220 and motors 240 in the event of a disruption of power from a primary power source 250. The backup power source 235 may comprise a battery, an auxiliary generator, a flywheel, an ultra-cap, some other power source, or some combination thereof. The backup power source 235 may be rechargeable, but can alternately be a single use, and/or have any suitable cell chemistry (e.g., Li-ion, Ni-cadmium, lead-acid, alkaline, etc.). The backup power source is sufficiently sized to concurrently power all flight components necessary to provide aircraft control authority and or sustain flight (e.g., alone or in conjunction with other backup power sources). The backup power source 235 may be sized to have sufficient energy capacity to enable a controlled landing, power the aircraft for a at least a predetermined time period (e.g., 10 minutes, 20 minutes, 30 minutes, etc.), or some combination thereof. In some embodiments, the backup power source 235 can power the flight control computer 220, aircraft sensors 245, and the motors 240 for the predetermined time period.

The backup power sources 235 can include any suitable connections. In some embodiments, each backup power source 235 may supply power to a single channel. In some embodiments, power can be supplied by a backup power source 235 over multiple channels, shared power connection with other backup power systems 235, and/or otherwise suitably connected. In some embodiments, the backup power sources 235 can be connected in series between the primary power source 250 and the flight control computer 220. In some embodiments, the backup power source 235 can be connected to the primary power source 250 during normal operation and selectively connected to the flight control computer 220 during satisfaction of a power failure condition. In some embodiments, the backup power source 235 can be connected in parallel with the primary power source 250. However, the backup power source can be otherwise suitably connected.

The backup power sources 235 may be maintained at substantially full state of charge (SoC) during normal flight (e.g., 100% SoC, SoC above a predetermined threshold charge), however can be otherwise suitably operated. In some embodiments, the backup power sources 235 draw power from the primary power source 250 during normal flight, may be pre-charged (or installed with a full charge) before flight initiation, or some combination thereof. The backup power sources 235 may employ load balancing to maintain a uniform charge distribution between backup power sources 235, which may maximize a duration of sustained, redundant power. Load balancing may occur during normal operation (e.g., before satisfaction of a power failure condition), such as while the batteries are drawing power from the primary power source 250, during discharge, or some combination thereof.

Backup power may be employed in response to satisfaction of a power failure condition. A power failure condition may include: failure to power the actuator from aircraft power (e.g., main power source, secondary backup systems such as ram air turbines, etc.), electrical failure (e.g., electrical disconnection of UACR from primary power bus, power cable failure, blowing a fuse, etc.), primary power source 250 (e.g., generator, alternator, engine, etc.) failure, power connection failure to one or more flight components (e.g., actuators, processors, drivers, sensors, batteries, etc.), fuel depletion below a threshold (e.g., fuel level is substantially zero), some other suitable power failure condition, or some combination thereof. In some embodiments, a power failure condition can be satisfied by a manual input (e.g., indicating desired use of backup power, indicating a power failure or other electrical issue).

The motors 240A, 240B, 240C (Collectively 240) are configured to move an actuator 215 to modify the position of an aircraft component. Motors 240 may include rotary actuators (e.g., motor, servo, etc.), linear actuators (e.g., solenoids, solenoid valves, etc.), hydraulic actuators, pneumatic actuators, any other suitable motors, or some combination thereof. In some embodiments, an actuator 215 may comprise one motor 240 and associated electronics in each channel corresponding to each flight control computer 220. For example, the illustrated actuator 215 comprises three motors 240, each motor 240 associated with a respective flight control computer 220. In some embodiments, an actuator 215 may comprise a single motor 240 that comprises an input signal from each channel corresponding to each flight control computer 220. Each flight control computer 220 may be capable of controlling all actuators 215 by controlling all motors 240 within that channel.

The actuators 215 may be configured to manipulate control surfaces to affect aerodynamic forces on the aircraft to execute flight control. The actuators 215 may be configured to replace manual control to components, include the power-plant, flaps, brakes, etc. In some embodiments, actuators 215 may comprise electromagnetic actuators (EMAs), hydraulic actuators, pneumatic actuators, any other suitable actuators, or some combination thereof. Actuators 215 may directly or indirectly manipulate control surfaces. Control surfaces may include rotary control surfaces (e.g., rotor blades), linear control surfaces, wing flaps, elevators, rudders, ailerons, any other suitable control surfaces, or some combination thereof. In some embodiments, actuators 215 can manipulate a swashplate (or linkages therein), blade pitch angle, rotor cyclic, elevator position, rudder position, aileron position, tail rotor RPM, any other suitable parameters, or some combination thereof. In some embodiments, actuators 215 may include devices configured to power primary rotor actuation about the rotor axis (e.g., in a helicopter).

The motors 240 may be electrically connected to any suitable number of backup power sources via the harness. The motors 240 can be connected to a single backup power source, subset of backup power sources, and/or each backup power source. In normal operation, each motor 240 in each channel may be powered by the flight control computer 220 in that channel. The motors 240 may be wired in any suitable combination/permutation of series/parallel to each unique power source in each channel. The motors 240 may be indirectly electrically connected to the primary power source 250 via the backup power source (e.g., with the backup power source connected in series between the motor 240 and primary power source 250), but can alternatively be directly electrically connected to the primary power source 250 (e.g., separate from, or the same as, that powering the backup power source). The flight control computer 220 in each channel independently powers and provides signals to each channel. The various components may be connected by a harness, which functions to electrically connect various endpoints (e.g., modules, actuators, primary power sources, human machine interface, external sensors, etc.) on the aircraft. The harness may include any suitable number of connections between any suitable endpoints. The harness may include a single (electrical) connector between the harness and each module, a plurality of connectors between each harness and each module, or some combination thereof. In some embodiments, the harness includes a primary power (e.g., power in) and a flight actuator connection (e.g., power out) to each module. In some embodiments, the harness can include separate power and data connections, but these can alternately be shared (e.g., common cable/connector) between various endpoints. The harness may comprise inter-module connections between each module and a remainder of the modules.

The harness may comprise intra-module electrical infrastructure (e.g., within the housing), inter-module connections, connections between modules and sensors (e.g., magnetometers, external air data sensors, GPS antenna, etc.), connections between modules and the human machine interface, and/or any other suitable connections. Intra-module connections can, in variants, have fewer protections (e.g., EMI protections, environmental, etc.) because they are contained within the housing. In variants, inter-module connections can enable voting between processors, sensor fusion, load balancing between backup power sources, and/or any other suitable power/data transfer between modules. In variants retrofitting an existing aircraft and/or installed aftermarket, the harness can integrate with and/or operate in conjunction with (e.g., use a portion of) the existing aircraft harness.

Example Fat Voter

Figure 3:
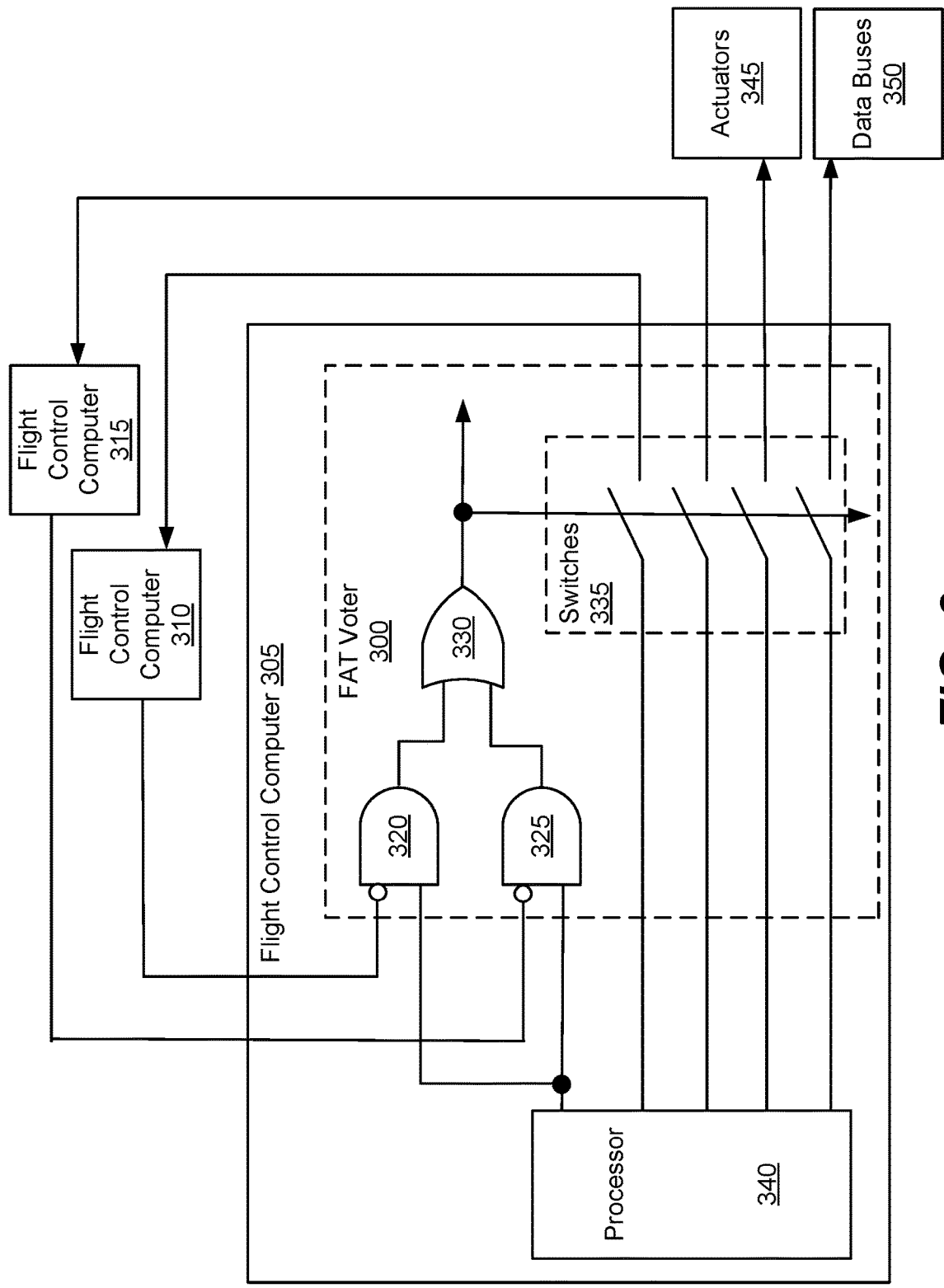
FIG. 3 illustrates one example embodiment of schematic diagram for a fully analyzable and testable voter system.

FIG. 3 illustrates one example embodiment of schematic diagram for a fully analyzable and testable (FAT) voter 300 of a flight control computer 305. For example, the FAT voter 300 may be an embodiment of the FAT voters 230 of FIG. 2. The FAT voter 300 may be analyzed by measuring the values at each location in the schematic diagram shown in FIG. 3. The FAT voter 300 may be tested by inputting test values to the FAT voter 300 and measuring the output values. Although the embodiments depicted in FIG. 3 are particularly directed to operating an aircraft (e.g., a rotorcraft or fixed wing aircraft), one skilled in the art will appreciate that similar interfaces can be applied to other vehicles, such as motor vehicles or watercraft.

The FAT voter 300 works in conjunction with the FAT voters of other flight control computers 310, 315 to determine which channels should be enabled or disabled to control an aircraft component. The flight control computers 305, 310, 315 may be embodiments of the flight control computers 220 of FIG. 2. The flight control computers 310, 315 may each comprise a FAT voter similar to the FAT voter 300. The FAT voter 300 comprises a first AND gate 320, a second AND gate 325, an OR gate 330, and a plurality of switches 335.

The first AND gate 320 is configured to receive a first input from the flight control computer 310 representing an assessment by the flight control computer 310 of the sanity of the flight control computer 305. If the flight control computer 310 determines that the flight control computer 305 is malfunctioning and should be deactivated, the flight control computer 310 outputs a value of 1 to the first AND gate 320. The value is inverted prior to the AND computation by the first AND gate 320. The first AND gate 320 is configured to receive a second input signal from the processor 340 of the flight control computer 305 representing a self-assessment performed by the processor 340. If the processor 340 determines that the flight control computer 305 is functioning properly, the processor 340 outputs a value of 1 to the first AND gate 320 and the second AND gate 325.

The second AND gate is configured to receive a first input from the flight control computer 315 representing an assessment by the flight control computer 315 of the sanity of the flight control computer 305. If the flight control computer 315 determines that the flight control computer 305 is malfunctioning and should be deactivated, the flight control computer 315 outputs a value of 1 to the second AND gate 325. The value is inverted prior to the AND computation by the second AND gate 325.

The OR gate 330 is configured to receive the outputs from the first AND gate 320 and the second AND gate 325 and output a signal to the switches 335. In response to the OR gate 330 outputting a 1, the switches are connected, allowing the processor 340 to provide commands, power, or some combination thereof to the flight control computer 310, the flight control computer 315, one or more actuators 345, and one or more data buses 350. In response to the OR gate 330 outputting a 0, the switches 335 are disconnected, preventing the processor 340 from providing commands, power, or any combination thereof to the flight control computer 310, the flight control computer 315, the one or more actuators 345, and the one or more data buses 350. Additionally, an output of 0 from the FAT voter 300 may cause the flight control computer 305 to shut off power to the flight control computer 305.

In the event that the processor 340 determines that the flight control computer 305 has failed a self-assessment, the logic of the FAT voter 300 will output a 0 to the switches, thus preventing the flight control computer 305 from providing potentially faulty instructions to other aircraft components. Similarly, in the event that both the flight control computer 310 and the flight control computer 315 determine that the flight control computer 305 is malfunctioning, the logic of the FAT voter 300 will output a 0 to the switches, thus preventing the flight control computer 305 from providing potentially faulty instructions to other aircraft components, regardless of the outcome of the self-assessment performed by the processor 340. However, if the processor 340 determines that the flight control computer 305 has passed the self-assessment routine, and at least one of the flight control computers 310, 315 determines that the flight control computer 305 is functioning properly, the logic of the FAT voter 300 will output a 1 to the switches 335, allowing the flight control computer 305 to provide instructions to other aircraft components. The flight control computer 305 may output a signal to the flight control computer 310 representative of an assessment of the flight control computer 310 by the flight control computer 305, such as an "enable" or "disable" signal (1 or 0, respectively). The flight control computer 305 may output a signal to the flight control computer 315 representative of an assessment of the flight control computer 315 by the flight control computer 305. The flight control computer 305 may output instructions, power, or some combination thereof to the motors in the same channel as the flight control computer 305, thus controlling the actuators 345. The flight control computer may output instructions, power, or some combination thereof to the data buses 350. The data buses 350 may provide an interface to other aircraft systems, such as landing gear, flaps, fuel tank selectors, radio frequency selectors, landing lights, etc.

As illustrated, the FAT voter 300 is part of a triple-redundancy system including three flight control computers 305, 310, 315. However, any suitable number of flight control computers and/or channels may be utilized to increase or decrease the redundancy of the system. In systems having an even number of flight control computers, a big brother logic may be implemented to break any tie votes by the FAT voter 300. In the illustrated embodiment having an odd number (three) flight control computers 305, 310, 315, the FAT voter 300 comprises a built-in big brother logic, such that in the event that one flight control computer is malfunctioning, the other two flight control computers are incapable of voting the other out. The discrete dedicated connections between the flight control computers 305, 310, 315 provide a high integrity of broadcasting disable signals between the flight control computers 305, 310, 315, as the redundancy system does not rely on protocols or communication bus controllers. Additionally, the small number of gates in the FAT voter 300 advantageously utilize a small number of discrete electronic components and can be fully tested during serial production by tools such as a flying probe.

Example Power Redundancy Architecture

Figure 4:
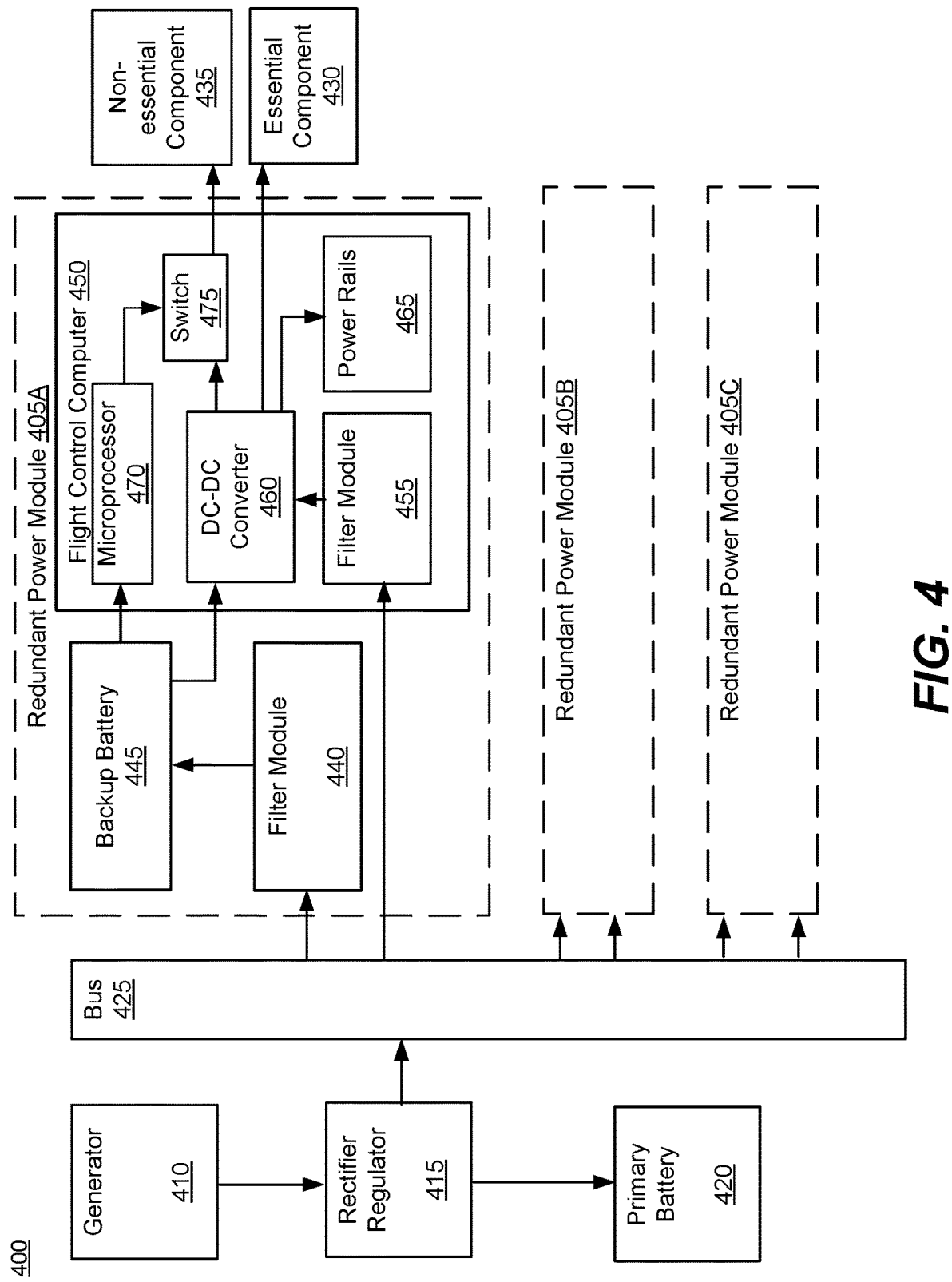
FIG. 4 illustrates one example embodiment of a configuration for a set of redundant power modules.

FIG. 4 illustrates one example embodiment of schematic diagram for a power redundancy architecture 400 having three redundant power modules 405A, 405B, 405C. The redundant power modules 405A, 405B, 405C may be embodiments of the backup power sources 235 of FIG. 2. Although the embodiments depicted in FIG. 4 are particularly directed to operating an aircraft (e.g., a rotorcraft or fixed wing aircraft), one skilled in the art will appreciate that similar interfaces can be applied to other vehicles, such as motor vehicles or watercraft.

The power redundancy architecture 400 is configured to provide power to aircraft components in the event of a disruption of power from a primary power source. The power redundancy architecture 400 may comprise a generator 410, a rectifier regulator 415, a primary battery 420, a bus 425, one or more redundant power modules 405, one or more essential components 430, and one or more non-essential components 435.

The generator 410 is configured to generate power for the aircraft under normal operation. In some embodiments, the generator may comprise an alternator coupled to an aircraft engine. In some embodiments, the generator 410 may comprise a power source separate from the aircraft engine, such as an auxiliary power unit (APU). The generator 410 transmits alternating current to the rectifier regulator 415.

The rectifier regulator 415 is configured to convert the alternating current into direct current. Most aircraft components are designed to utilize direct current. However, in some embodiments, the generator 410 and the aircraft bus 425 may be alternating current. The rectifier regulator 415 may comprise an inverter. The rectifier regulator 415 provides the direct current to the primary battery 420 and the bus 425.

The primary battery 420 is configured to provide power to the aircraft when power from the generator 410 is unavailable. For example, the primary battery 420 may provide power to the aircraft when the aircraft is on the ground with the engine off, or to start the engine. In some embodiments, the primary battery 420 may provide power to some or all aircraft components while the generator 410 simultaneously provides power to some or all aircraft components. The generator 410, rectifier regulator 415, and primary battery 420 are referred to herein as the primary power source.

The bus 425 is configured to provide a connection point between the rectifier regulator 415 and the redundant power modules 405. The bus 425 receives direct current from the rectifier regulator 415 and provides direct current to the redundant power modules. The bus 425 may comprise one or more conductive rails having connection sites. The connection between the bus 425 and the redundant power modules 405 may comprise one or more circuit breakers configured to eliminate the electrical connection between the bus 425 and the redundant power modules 405 in the event of a voltage spike which could damage the components downstream of the bus 425, such as in the event of a lightning strike.

The redundant power modules 405 are configured to provide power to aircraft components in the event of a disruption in power from the primary power source. The redundant power module 405A may comprise a filter module 440, a backup battery 445, and a flight control computer 450.

The redundant power modules 405B, 405C may comprise the same or similar components as the redundant power module 405A. However, the components of redundant power modules 405B, 405C are not shown in FIG. 4 for ease of illustration.

The filter module 440 is configured to filter the current provided to the backup battery 445. The filter module 440 may provide transient protection to prevent voltage or current spikes, such as from lightning strikes or radio tower interference, from damaging the backup battery 445. The filter module 440 may comprise a polarity reverser, to facilitate power continuity in the event of an improperly installed battery. The filter module 440 may filter the aircraft bus power before using the power anywhere else in the aircraft. The filter module 440 may isolate the downstream channels from adverse events such as lightning or accidental polarity reversals.

The backup battery 445 is configured to provide power to the flight control computer 450 in the event of a disruption from the primary power source. During normal operation, the backup battery may be charged by the generator 410. The backup battery 445 may comprise a battery management system that monitors the state of the battery, such as the charge level of the battery. The backup battery 445 may provide power to the DC-DC converter 460. The backup battery 445 may provide the state of the battery to the microprocessor 470. In some embodiments, the backup battery 445 may be external to a housing of the flight control computer 450. In some embodiments, the backup battery 445 may be located with the same housing as the flight control computer 450. The backup battery 445 may be coupled to the same rack as the flight control computer 450. In some embodiments, all redundant power modules 405, including their respective flight control computers and backup batteries, may be physically mounted to a single rack assembly.

The flight control computer 450 is configured to provide commands, power, or some combination thereof, to aircraft components, such as essential components 430 and non-essential components 435. The flight control computer 450 may be an embodiment of the flight control computer 220 of FIG. 2. The flight control computer 450 may comprise a filter module 455, a DC-DC converter 460, power rails 465, a microprocessor 470, and a switch 475.

The filter module 455 is configured to filter the current provided to the DC-DC converter 460. The filter module 455 may provide transient protection to prevent voltage or current spikes, such as from lightning strikes or radio tower interference, from damaging the DC-DC converter 460 or other downstream components. The filter module 455 may comprise a polarity reverser, to facilitate power continuity in the event of an improperly installed battery.

The DC-DC converter 460 is configured to convert the power received from the filter module 455 to different voltages for use by different components. For example, the DC-DC converter 460 may receive power at 24V, and the DC-DC converter 460 may output power at 6V, 12V, and 24V. The DC-DC converter 260 may output the power to the power rails 465, the essential components 430, and the non-essential components 435.

The power rails 465 are configured to provide connection locations for components of the flight control computer 450 to receive power. The power rails 465 may comprise rails at different voltages, such as 6V, 12V, 24V, or any other suitable voltages.

The microprocessor 470 is configured to receive a state of the backup battery 445 and control the switch 475 to limit power consumption. The state of the backup battery 445 may comprise, for example, a charge level of the battery. The microprocessor 470 may be configured to disconnect the switch 475 based on the state of the backup battery 445. For example, in response to the charge level of the backup battery 445 decreasing below a predetermined threshold, such as below 99%, below 50%, or below any other suitable threshold, the microprocessor 470 may disconnect the switch 475. The switch 475 may be any suitable switch capable of receiving a command and completing or disconnecting an electrical connection between the DC-DC converter 460 based on the command. Disconnecting the switch 475 will eliminate power consumption by the non-essential components 435, which will prolong the life of the backup battery 445 in emergency situations.

The essential components 430 may comprise aircraft components that are critical to flight safety. For example, the essential components 430 may comprise actuators for flight control surfaces, primary navigation screens, etc. In contrast, the non-essential components 435 may comprise aircraft components that are not critical for flight safety. For example, the non-essential components 435 may comprise a secondary navigation screen, passenger lighting, etc. By providing power to only the essential components 430 during use of the backup battery 445 for flight operation, the duration of safe flight in an emergency situation may be increased. Each channel may comprise a different set of essential components 430 and non-essential components 435. Each channel may shut down its own set of non-essential components 435, and in the aggregate the function and integrity of flight may be preserved. The flight control computer 220 may selectively shut down individual or groupings of non-essential components 435. The non-essential components 435 may be shut down in stages as backup power is drawn down.

Each redundant power module 405A, 405B, 405C, may comprise its own backup battery and flight control computer. The backup batteries may be used to power all actuators in a channel. Thus, the aircraft may comprise three channels, each channel having an independent backup power source, each channel capable of controlling every actuator on the aircraft, and each channel capable of shedding power to preserve the backup power source. Thus, even in the event of a disruption of power from the primary power source, the beneficial redundancies provided by the FAT Voters described with reference to FIGS. 1-3 may be maintained, and fly-by-wire systems with redundancy systems may be used to fly small aircraft while a primary power source is unavailable. Each channel may be floating relative to a chassis ground, which achieves the levels of isolation from conducted and emitted interference, as well as lightning, necessary in a fly-by-wire system. Providing the entire channel behind the filter module 440 assists in meeting certification standards. Additionally, in contrast to large aircraft, a malfunctioning flight control computer 450 may be easily removed and replaced to correct any number of malfunctions without having to conduct complex fault isolation and debugging methods.

Example Process for Providing Actuator Instructions in a Redundant Architecture

FIG. 5 is a flow diagram illustrating one embodiment of a process 500 a process for providing actuator instructions in a redundant architecture. In the example embodiment shown, the control and interface system is illustrated performing the steps of the process 500. However, some or all of the steps may be performed by other entities or components. In addition, some embodiments may perform the steps in parallel, perform the steps in different orders, or perform different steps. The control and interface system may be an embodiment of the universal vehicle control router 120, such as the universal avionics control router 205. Furthermore, the control and interface system may be integrated with one or more computer systems, such as the computer system 600 described with reference to FIG. 6.

The control and interface system receives 510 a flight control input for a small aircraft having a single power bus. For example, a human operator of an aircraft may provide the flight control inputs via one of the aircraft control interfaces. The flight control inputs may include one or more of a forward speed control input, a lateral speed control input, an elevation control input, or a heading control input, e.g., as described above with reference to FIG. 1.

The control and interface system generates 520 (e.g., using a first flight control computer of the avionics router) an actuator instruction for an actuator based on the flight control input. For example, if the flight control input is a heading control input, the first flight control computer may generate an instruction for a rudder actuator to change a position of the rudder. Each flight control computer may generate actuator instructions for one or more actuator motors in a channel including the flight control computer.

The control and interface system performs 530 (e.g., using the first flight control computer) a self-assessment of the first flight control computer. The self-assessment may comprise a software based assessment to evaluate whether the first flight control computer is operating correctly. Each flight control computer of the avionics router may perform a self-assessment. The self-assessment routine is described in more detail with respect to FIG. 2.

The control and interface system performs 540 an assessment of the first flight control computer by a second flight control computer. The assessment may comprise a software based assessment to evaluate whether the first flight control computer is operating correctly. The assessment routine is described in more detail with respect to FIG. 2. Each flight control computer may perform an assessment of all other flight control computers in the avionics router.

The control and interface system determines 550 (e.g., using a fully analyzable and testable voter), based in part on the self-assessment and the assessment of the first flight control computer by the second flight control computer, a validity of the actuator instruction generated by the first flight control computer. Each channel may comprise a fully analyzable and testable voter that determines a validity of an actuator instruction in its respective channel based on the self-assessment of the flight control computer in its channel and the assessments of the flight control computer in its channel by the other flight control computers.

The control and interface system transmits 560 (e.g., using the avionics router), in response to the actuator instruction being valid, the actuator instruction to the actuator. In some embodiments, the fully analyzable and testable voter may enable one channel to provide an actuator instruction to an actuator. In some embodiments, the fully analyzable and testable voter may enable all valid channels to send actuator instructions to motors on an actuator. The actuator instructions may cause the actuator to physically move an aircraft component.

Computing Machine Architecture

Figure 6:
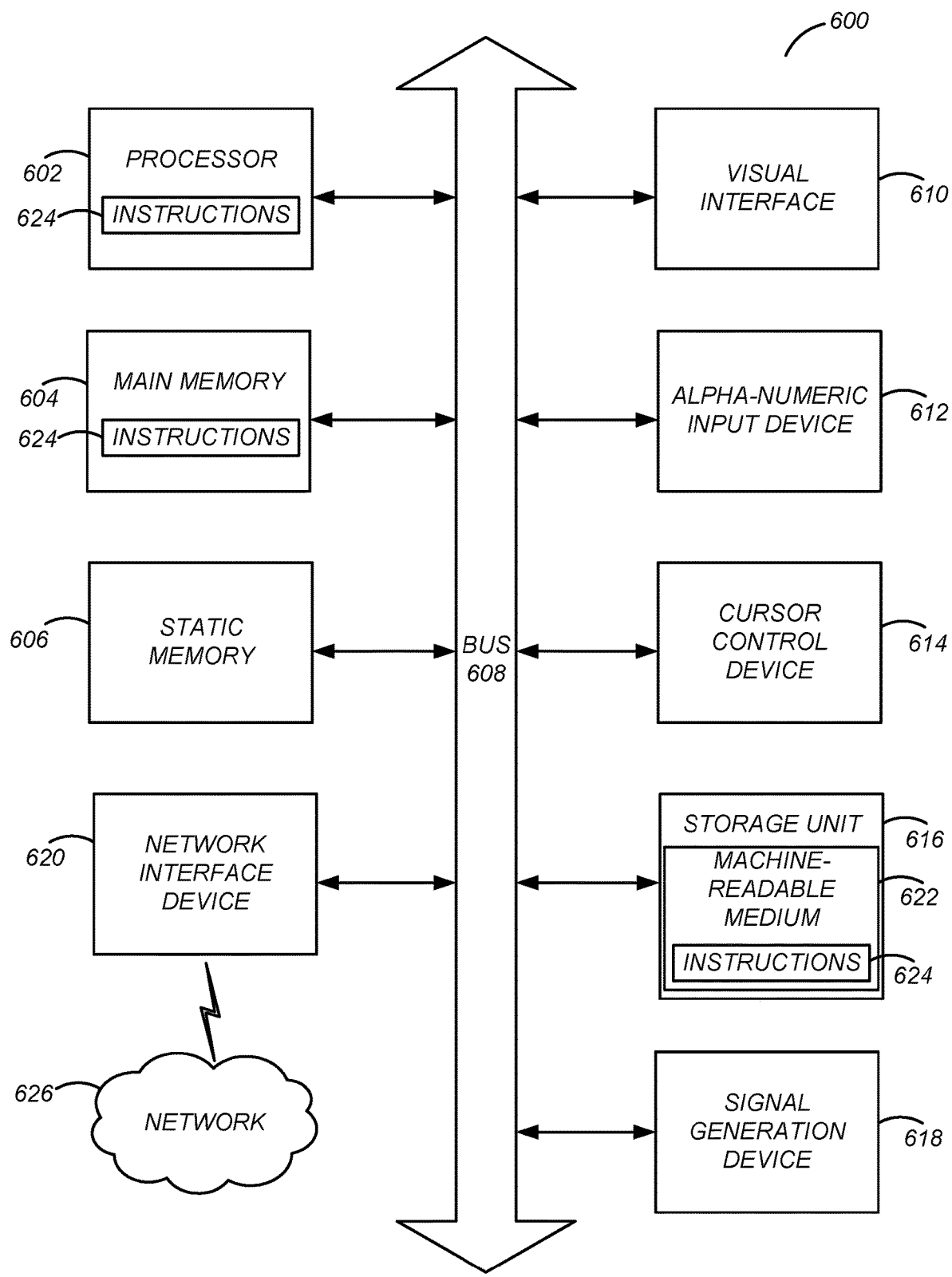
FIG. 6 is a block diagram illustrating one example embodiment of components of an example machine able to read instructions from a machine-readable medium and execute them in a processor (or controller).

FIG. 6 is a block diagram illustrating one embodiment of components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The computer system 600 may be used for one or more components of the vehicle control and interface system 100 depicted and described through FIGS. 1-5. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 600 includes one or more processors 602 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 604, and a static memory 606, which are configured to communicate with each other via a bus 608. The computer system 600 may further include visual display interface 610. The visual interface may include a software driver that enables (or provide) user interfaces to render on a screen either directly or indirectly. The visual interface 610 may interface with a touch enabled screen. The computer system 600 may also include input devices 612 (e.g., a keyboard a mouse), a storage unit 616, a signal generation device 618 (e.g., a microphone and/or speaker), and a network interface device 620, which also are configured to communicate via the bus 608.

The storage unit 616 includes a machine-readable medium 622 (e.g., magnetic disk or solid-state memory) on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution.

Additional Configuration Considerations

The disclosed systems may increase vehicle safety by providing a full fly-by-wire (FBW) architecture with a redundant architecture. For example, the FBW architecture may comprise triple redundancy, quadruple redundancy, or any other suitable level of redundancy. The systems may enable retrofitting an existing vehicle with an autonomous agent (and/or enable autonomous agent certification) by providing a sufficient degree of control and power redundancy to autonomous agents.

The disclosed systems may enable autonomous and/or augmented control schemes without relying on the pilot (or other operator) as a backup in the event of power failure. Accordingly, such systems may fully eliminate the 'direct human control' layer because augmented modes are persistent in the event of multiple power failures (e.g., augmented control modes can rely on triply-redundant, continuous backup power). Such systems may allow transportation providers and users to train in only a normal mode, thereby decreasing or eliminating training for 'direct' or 'manual' modes (where they are the backup; and relied upon to provide mechanical actuation inputs). Such systems may further reduce the cognitive load on pilots in safety-critical and/or stressful situations, since they can rely on persistent augmentation during all periods of operation. The systems are designed with sufficient redundancy that the vehicle may be operated in normal mode at all times. In contrast, conventional systems generally force operators to train in multiple backup modes of controlling an aircraft.

The disclosed systems may reduce vehicle mass and/or cost (e.g., especially when compared to equivalently redundant systems). By co-locating multiple flight critical components within a single housing, systems can reduce the cable length, minimize the number of distinct connections required for vehicle integration (thereby improving ease of assembly), and allow use of less expensive sensors and/or processors without an electronics bay (e.g., as individual components can often require unique electrical and/or environmental protections).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for universal vehicle control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A control router of a vehicle, the control router comprising:
a first control computer configured to:
provide first actuator commands to actuators coupled to components of the vehicle; and
perform a self-assessment of the first control computer;
a second control computer configured to:
provide second actuator commands to the actuators coupled to the components of the vehicle; and
perform an assessment of the first control computer; and a third control computer configured to:
provide third actuator commands to the actuators coupled to the components of the vehicle; and
perform an assessment of the first control computer,
wherein the first control computer is further configured to:
disable the first control computer from providing the first actuator commands to the actuators coupled to the components of the vehicle based on at least one of: (a) the self-assessment of the first control computer, (b) the assessment of the first control computer performed by the second control computer, or (c) the assessment of the first control computer performed by the third control computer.

2. The control router of claim 1, wherein, subsequent to the first control computer failing the self-assessment, the first control computer is configured to disable the first control computer from providing the first actuator commands to the actuators.

3. The control router of claim 2, wherein, subsequent to the first control computer failing the self-assessment, the first control computer is configured to disable the first control computer from providing the first actuator commands to the actuators regardless of (b) the assessment of the first control computer performed by the second control computer and (c) the assessment of the first control computer performed by the third control computer.

4. The control router of claim 1, wherein, subsequent to the first control computer failing (b) the assessment of the first control computer performed by the second control computer and (c) failing the assessment of the first control computer performed by the third control computer, the first control computer is configured to disable the first control computer from providing the first actuator commands to the actuators coupled to the components of the vehicle.

5. The control router of claim 4, wherein, subsequent to the first control computer (b) failing the assessment of the first control computer performed by the second control computer and (c) failing the assessment of the first control computer performed by the third control computer, the first control computer is configured to disable the first control computer from providing the first actuator commands to the actuators regardless of (a) the self-assessment of the first control computer.

6. The control router of claim 1, wherein, subsequent to the first control computer passing (a) the self-assessment of the first control computer, passing (b) the assessment of the first control computer performed by the second control computer and failing (c) the assessment of the first control computer performed by the third control computer, the first control computer is configured to enable the first control computer to provide the first actuator commands to the actuators coupled to the components of the vehicle.

7. The control router of claim 1, wherein:
the first control computer is further configured to perform an assessment of the third control computer;
the second control computer is further configured to perform an assessment of the third control computer; and
the third control computer is further configured to:
perform a self-assessment of the third control computer; and
disable the third control computer from providing the third actuator commands to the actuators coupled to the components of the vehicle based on at least one of: (a) the self-assessment of the third control computer, (b) the assessment of the third control computer performed by the first control computer, or (c) the assessment of the third control computer performed by the second control computer.

8. The control router of claim 7, wherein:
the first control computer is further configured to perform an assessment of the second control computer;
the third control computer is further configured to perform an assessment of the second control computer; and
the second control computer is further configured to:
perform a self-assessment of the second control computer; and
disable the second control computer from providing the second actuator commands to the actuators coupled to the components of the vehicle based on at least one of: (a) the self-assessment of the second control computer, (b) the assessment of the second control computer performed by the first control computer, or (c) the assessment of the second control computer performed by the third control computer.

9. A method comprising:
performing a self-assessment of a first control computer of a vehicle, the first control computer configured to provide first actuator commands to actuators coupled to components of the vehicle;
receiving an assessment of the first control computer performed by a second control computer, the second control computer configured to provide second actuator commands to the actuators coupled to the components of the vehicle;
receiving an assessment of the first control computer performed by a third control computer, the third control computer configured to provide third actuator commands to the actuators coupled to the components of the vehicle; and
disabling the first control computer from providing the first actuator commands to the actuators coupled to the components of the vehicle based on at least one of: (a) the self-assessment of the first control computer, (b) the assessment of the first control computer performed by the second control computer, or (c) the assessment of the first control computer performed by the third control computer.

10. The method of claim 9, wherein disabling the first control computer from providing the first actuator commands comprises, subsequent to the first control computer failing the self-assessment, disabling the first control computer from providing the first actuator commands to the actuators.

11. The method of claim 10, wherein disabling the first control computer from providing the first actuator commands comprises, subsequent to the first control computer failing the self-assessment, disabling the first control computer from providing the first actuator commands to the actuators regardless of (b) the assessment of the first control computer performed by the second control computer and (c) the assessment of the first control computer performed by the third control computer.

12. The method of claim 9, wherein disabling the first control computer from providing the first actuator commands comprises, subsequent to the first control computer failing (b) the assessment of the first control computer performed by the second control computer and (c) failing the assessment of the first control computer performed by the third control computer, disabling the first control computer from providing the first actuator commands to the actuators.

13. The method of claim 12, wherein disabling the first control computer from providing the first actuator commands comprises, subsequent to the first control computer (b) failing the assessment of the first control computer performed by the second control computer and (c) failing the assessment of the first control computer performed by the third control computer, disabling the first control computer from providing the first actuator commands to the actuators regardless of (a) the self-assessment of the first control computer.

14. The method of claim 9, wherein disabling the first control computer from providing the first actuator commands comprises, subsequent to the first control computer passing (a) the self-assessment of the first control computer, passing (b) the assessment of the first control computer performed by the second control computer and failing (c) the assessment of the first control computer performed by the third control computer, enabling the first control computer to provide the first actuator commands to the actuators.

15. A non-transitory computer-readable storage medium storing instructions that, when executed by a first control computer of a vehicle, cause the first control computer to perform operations comprising:

performing a self-assessment of the first control computer, the first control computer configured to provide first actuator commands to actuators coupled to components of the vehicle;

receiving an assessment of the first control computer performed by a second control computer, the second control computer configured to provide second actuator commands to the actuators coupled to the components of the vehicle;

receiving an assessment of the first control computer performed by a third control computer, the third control computer configured to provide third actuator commands to the actuators coupled to the components of the vehicle; and disabling the first control computer from providing the first actuator commands to the actuators coupled to the components of the vehicle based on at least one of: (a) the self-assessment of the first control computer, (b) the assessment of the first control computer performed by the second control computer, or (c) the assessment of the first control computer performed by the third control computer.

16. The non-transitory computer-readable storage medium of claim 15, wherein disabling the first control computer from providing the first actuator commands comprises, subsequent to the first control computer failing the self-assessment, disabling the first control computer from providing the first actuator commands to the actuators.

17. The non-transitory computer-readable storage medium of claim 16, wherein disabling the first control computer from providing the first actuator commands comprises, subsequent to the first control computer failing the self-assessment, disabling the first control computer from providing the first actuator commands to the actuators regardless of (b) the assessment of the first control computer performed by the second control computer and (c) the assessment of the first control computer performed by the third control computer.

18. The non-transitory computer-readable storage medium of claim 15, wherein disabling the first control computer from providing the first actuator commands comprises, subsequent to the first control computer failing (b) the assessment of the first control computer performed by the second control computer and (c) failing the assessment of the first control computer performed by the third control computer, disabling the first control computer from providing the first actuator commands to the actuators.

19. The non-transitory computer-readable storage medium of claim 18, wherein disabling the first control computer from providing the first actuator commands comprises, subsequent to the first control computer (b) failing the assessment of the first control computer performed by the second control computer and (c) failing the assessment of the first control computer performed by the third control computer, disabling the first control computer from providing the first actuator commands to the actuators regardless of (a) the self-assessment of the first control computer.

20. The non-transitory computer-readable storage medium of claim 15, wherein disabling the first control computer from providing the first actuator commands comprises, subsequent to the first control computer passing (a) the self-assessment of the first control computer, passing (b) the assessment of the first control computer performed by the second control computer and failing (c) the assessment of the first control computer performed by the third control computer, enabling the first control computer to provide the first actuator commands to the actuators.

* * * * *